Dec. 5, 1950         J. D. PETERSON         2,532,936
ALTITUDE CORRECTED LANDING SYSTEM FOR AIRCRAFT
Filed April 18, 1947
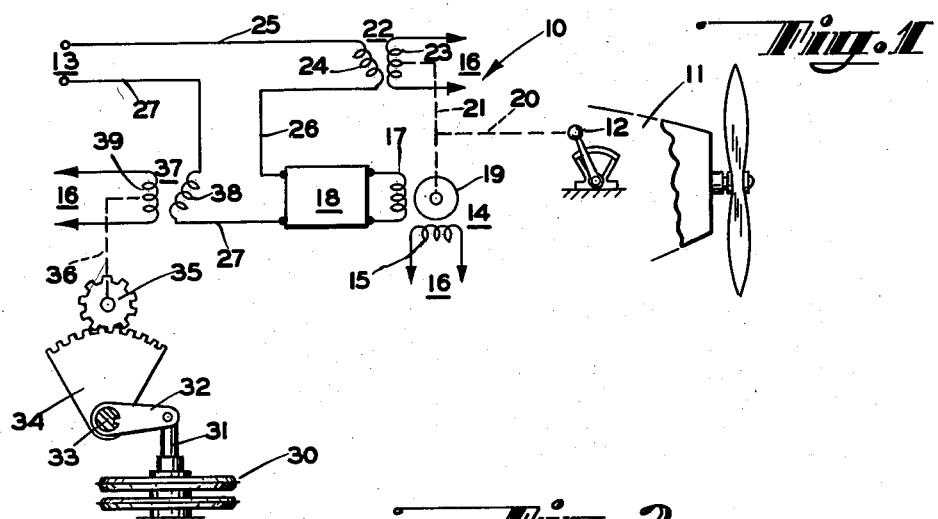
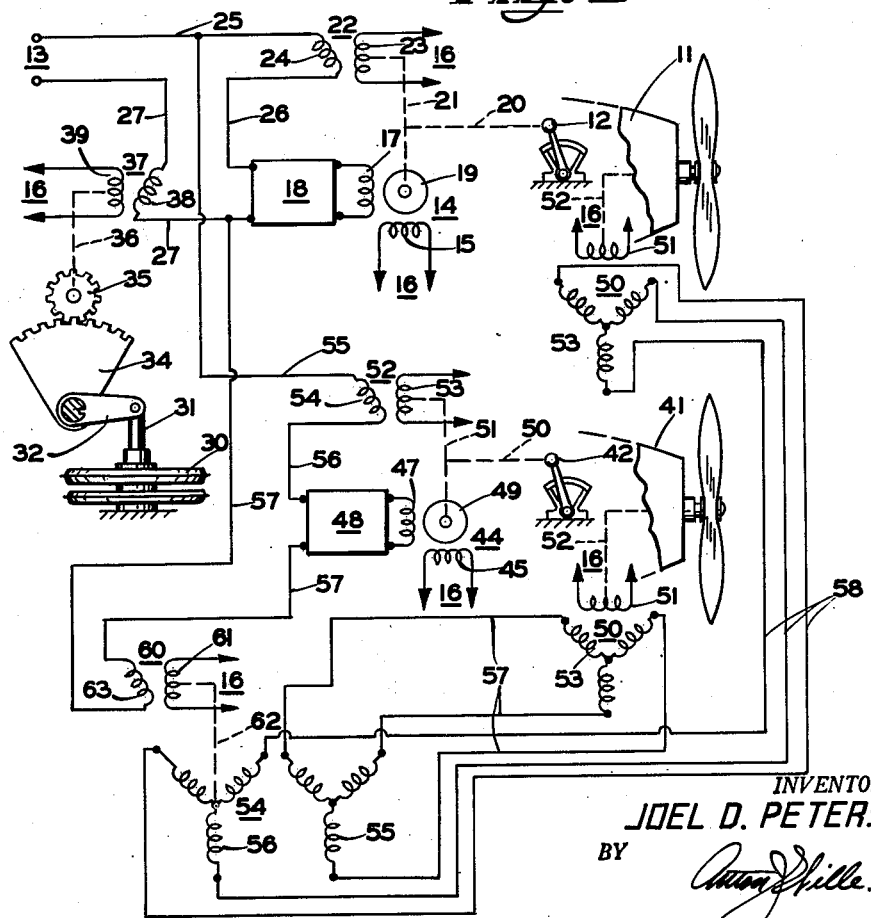
INVENTOR.
JOEL D. PETERSON
BY
— ATTORNEY —

Patented Dec. 5, 1950

2,532,936

UNITED STATES PATENT OFFICE 2,532,936

ALTITUDE CORRECTED LANDING SYSTEM FOR AIRCRAFT

Joel D. Peterson, Ridgewood, N. J., assignor to Bendix Aviation Corporation, Teterboro, N. J., a corporation of Delaware Application April 18, 1947, Serial No. 742,439

12 Claims. (Cl. 244—77)

This invention relates to automatic landing systems for aircraft, and more particularly to an altitude corrected landing system for controlling the airspeed of aircraft on landing approaches and for synchronizing the speeds of the engines on multi-engined aircraft.

This application is an improvement on the Engine Control and Synchronization System shown in my co-pending application bearing Serial No. 742,438 and filed on April 18, 1947.

In automatic landing systems two radio beams, signal modulated, are broadcast from the airfield for landing aircraft suitably equipped with the necessary radio receiver, computer, and flight surface controls. One beam of the landing system generally known as the localizer beam, will by its signal voltages bring in aircraft over a particular flight strip. The other beam, known as the glide path control beam, will bring down aircraft onto the particular flight strip. Such a system is fully described in the copending application of Paul A. Noxon et al. for Automatic Control of Mobile Craft bearing Serial No. 705,524, and filed on October 25, 1946.

In my parent application, I have described an engine control system wherein the speed of the aircraft engine is controlled by the signals of the glide-path beam and in which, in the case of multi-engined craft, the engine speeds are synchronized. As is well-known in the art, aircraft engine speed is reduced when approaches are made for landing. The system described in the parent case will reduce the speed of engine operation in response to the computer signal voltages, the engines being maintained in synchronism at all times.

The system as described in my parent application will operate satisfactorily when aircraft thus equipped are flying routes wherein the various ports of call are approximately at the same altitude, as for example, those airlines servicing the eastern coast of North and South America. In the case of transcontinental routes it was found that an altitude correction was necessary to permit landings at airfields at varying altitudes such as the airports at New York city or Washington, D. C., approximately at sea level, and at Denver, Colorado, or Mexico City, where the altitude is well over 5,000 feet.

As previously stated, the glide path beam is used to bring down aircraft on a particular flight strip by actuation of the elevators and by reducing the torque of the engines. The same reduction in airspeed, however, at 1,000 feet above an air strip located at Washington, D. C., and over a strip at Mexico City may prove disastrous in view of the difference in air density at these elevations. To maintain controlled flight in descending from approximately 1,000 feet above Mexico City the throttle position must be shifted to provide a greater air intake than in descending at the airport at Washington, D. C.

It is, therefore, an object of my present invention to provide an altitude corrected control circuit for controlling the engine torque of aircraft in response to signal voltages developed by a computer in the glide path control beam channel of an automatic landing system.

A further object of this invention is to provide an altitude corrected control circuit for multi-engined aircraft for controlling the engine torque in response to beamed signals, and for synchronizing the engines to signal responsive speeds.

Another object of this invention is to provide a highly improved and compact altitude corrected engine control and synchronizing system which shall be entirely automatic in its operation, positive in its action, and relatively inexpensive to manufacture, which shall have a large variety of applications, and yet be practical and efficient to a high degree in use.

Other objects of this invention will in part be obvious, and in part hereinafter pointed out.

The invention accordingly consists in features of construction, combinations of elements, and arrangements of parts which will be exemplified in the construction hereinafter described, and of which the scope of application will be indicated in the appended claims.

In the accompanying drawings forming a part of this specification in which two of the various possible illustrative embodiments of my invention are shown, and wherein similar reference characters designate corresponding elements in the two views, Fig. 1 is a schematic wiring diagram of an altitude corrected control circuit for controlling the engine torque of aircraft in response to signal voltages; while Fig. 2 is a schematic wiring diagram of an altitude corrected control system for controlling the torque and synchronizing the engines of a multi-engined plane.

Referring now to Fig. 1 of the drawings, 10 designates a control circuit embodying my invention for controlling the torque of an engine 11 having a throttle control lever 12 for altering the speed of engine operation. The circuit 10 interconnects a source of signal voltage 13 forming the output terminals of a computer (not shown)

in the glide path control channel of a receiver, with a two phase induction motor 14 for moving the throttle lever 12.

The induction motor 14 comprises a fixed phase 15 connected across a suitable source of potential 16, a variable phase 17 fixed to the output of an amplifier 18, and a rotor 19. The rotor 19 is geared or coupled in a suitable manner as indicated by the dotted line 20, to shift the throttle lever 12 upon rotation thereof.

The induction motor is further coupled as by 21, to a synchronous motor, receiver, or rotary transformer 22. The receiver 22 comprises a rotor 23 coupled to rotor 19 and connected to the source of potential 16, and a stator winding 24 connected at one end by lead 25 to one terminal of the signal source 13. The other end of the winding is connected by lead 26 to an input terminal of the amplifier 18. The other amplifier terminal is connected by lead 27 to the second terminal of the signal source.

The signal voltage of the source 13 is balanced by the voltage induced in stator winding 24 by the positioning of the receiver rotor 23. No voltage is supplied to the input side of the amplifier 18. The induction motor is thus at a standstill. Upon a change in the signal voltage, the circuit described is unbalanced to operate the induction motor 14. The rotation of the rotor 19 will position the receiver rotor 23 to rebalance the circuit, at the same time shifting the throttle lever 12 to a new position in response to the signal voltage, to decrease (or increase) the torque delivered.

Means is now provided to introduce into the control circuit described a signal voltage which is proportional to the altitude of the plane in which the present system is installed.

To this end, there is provided an aneroid capsule 30, the exterior of which is subjected to atmospheric pressure. Integral with said aneroid is a stud 31 having pivoted at its free end an arm 32. The other end of arm 32 is keyed to a shaft 33 to which is fixed a sector gear 34. The teeth of the sector gear mesh with the teeth of a pinion 35 carried by a shaft 36. Coupled to the shaft in a suitable manner is a synchronous generator, transmitter, or rotary transformer 37.

The transmitter 37 comprises a stator winding 38 connected into the lead 27 of the signal source 13, and a rotor winding 39 angularly displaceable by shaft 36 and connected across the power supply 16. The expansion and contraction of the aneroid 30 will displace the transmitter rotor 39. The voltage induced in the stator winding 38 by the rotor 39 will vary in accordance with the changes in the altitude of the aircraft.

The induced voltage in stator winding 38 is in series with the signal voltages of the source 13. Thus, a signal voltage representative of the altitude of the aircraft is added into the control circuit to be balanced by the receiver 22. A change in either the signal voltage of source 13, or in the signal voltage of the altitude transmitter 37 will unbalance the control circuit requiring an angular displacement of the receiver rotor 23. The throttle lever 12 will be shifted accordingly in rebalancing the circuit to provide an engine speed in conformity with the beamed signals and the altitude of the plane.

Referring now to Fig. 2 of the drawings, I have illustrated an altitude corrected system for a multi-engined plane, the engine 11 and its altitude corrected system being incorporated therein as the master engine together with an engine designated 41 and hereinafter referred to as the slave engine.

The slave engine 41 is provided with a throttle control lever 42 for controlling the speed thereof. An induction motor 44 is provided having a fixed phase 45, a variable phase 47 connected to the output of an amplifier 48, and a rotor 49 coupled as by 50, to the lever 42. The rotor 49 is also adapted to drive a receiver 52 through a coupling 51.

The receiver 52 has a rotor coil 53 connected across power supply 16 and a stator winding 54 connected by lead 55 to the lead 25 of the signal source 13. The other side of the stator winding is connected by wire 56 to an input terminal of the amplifier 48 and by wire 57 to the input lead 27 of the amplifier 18.

The two control circuits for the engines 11 and 41 are thus connected in parallel across the signal source 13 and the altitude signal source (stator 38). Unbalance of the circuits by changes in beamed signal voltage or in altitude signal voltage will operate the motors 14 and 44 in the manner hereinbefore described, to rebalance the circuits and control the engine speeds in accordance with the beamed signals and the altitude of the plane.

Means is now provided to bring the speed of engine 41 into absolute synchronism with that of engine 11.

To this end, engines 11 and 41 are provided with synchronous generators or transmitters 50 having rotors 51 connected across the power supply 16 and coupled to the propellor shaft as indicated by the dotted line 52; and a three phase stator winding 53. A differential motor 54 is also provided having three phase stator and rotor windings 55 and 56. The stator winding 55 is connected by leads 57 to the slave stator winding, while the rotor winding 56 is connected by leads 58 to the master stator winding.

The rotation of the generator rotors 51 by their respective propellor shafts will induce a voltage in the stator windings resulting in a rotating magnetic field in the stator, the speed of which is a function of the engine speed. A difference in the speeds of the engines 11 and 41 will cause a difference in the speeds of the rotating magnetic fields of the stator and rotor windings of the differential motor 54. The reaction of the magnetic fields will cause the rotor winding 56 to rotate at a speed proportional to the difference in engine speeds.

A synchronous generator, transmitter, or rotary transformer 60 is provided to produce a signal voltage proportional to the difference in engine speed, which is impressed on the slave motor circuit to bring the same into synchronism.

The transmitter 60 comprises a rotor coil 61 connected across the power supply 16 and coupled to the differential rotor 56 as by 62, and a stator winding 63. The winding 63 is connected into the lead 57 in series with the signal voltage source 13 and the altitude voltage source (stator) 38.

Any difference in the speed of engines 11 and 42 will cause the rotor 61 to be displaced for inducing a signal voltage in the winding 63. This signal voltage will unbalance the slave engine control circuit to bring about the operation of motor 44 to rebalance the circuit and change the speed of engine 41 to correspond with that of engine 11, as fully described in my parent application.

It will be readily appreciated by those skilled in the art, that the inductive devices 22, 37, 52, and 60 may readily be replaced by other sources of variable potential, or by devices for varying the strength of the signal voltages of source 13.

It will be thus seen that there is provided an altitude corrected control and synchronization system in which the several objects of this invention are achieved and which is well adapted to meet the conditions of practical use.

As various possible embodiments of the invention may be made, and as various changes may be made in the embodiment above set forth, it is to be understood that all matter herein set forth, or shown in the accompanying drawing, is to be interpreted as illustrative and not in a limiting sense.

Having thus described my invention, I claim as new and desire to secure by Letters Patent:

1. In an automatic landing system for aircraft, the combination of a source of signal voltage controlled by the glide path beam channel of the system with means for regulating the airspeed of a craft, a circuit interconnecting said signal source with said regulating means including two windings therein, means for inducing in one of said windings a voltage proportional to the altitude of the craft, and means for inducing a voltage in the other of said windings to offset the voltages of said source and the other of said windings, the unbalance of said circuit operating said regulating means, the operation of said regulating means controlling the balancing voltages induced in said second winding to rebalance said circuit.

2. In an automatic landing system for aircraft in which a radiant energy beam is received aboard the craft and the signal voltages derived therefrom are utilized to control landing of the craft, the combination of the source of said signal voltages with means for regulating the aircraft engine torque in response to said signal voltages, and means for varying the signal voltages in accordance with the altitude of the aircraft.

3. In an automatic landing system for aircraft in which a radiant energy beam is received aboard the craft and the signal voltages derived therefrom are utilized to control landing of the craft, the combination of the source of said signal voltages with means for regulating the aircraft engine torque, motive means responsive to said signal voltages for actuating said regulating means, and means for varying the operation of said motive means in accordance with the altitude of the craft.

4. In an automatic landing system for aircraft in which a radiant energy beam is received aboard the craft and the signal voltages derived therefrom are utilized to control landing of the craft, the combination of the source of said signal voltages with means for regulating the torque of an aircraft engine, motive means for actuating said regulating means, and a source of signal voltage proportional to the altitude of the aircraft, said first and second voltage sources controlling the operation of said motive means.

5. In an automatic landing system for aircraft in which a radiant energy beam is received aboard the craft and the signal voltages derived therefrom are utilized to control landing of the craft, the combination of the source of said signal voltages with means for regulating the torque of an aircraft engine, motive means for actuating said regulating means, and a source of signal voltage proportional to the altitude of the aircraft, said first and second signal sources being in series and controlling the operation of said motive means.

6. In an automatic landing system for aircraft in which a radiant energy beam is received aboard the craft and the signal voltages derived therefrom are utilized to control landing of the craft, the combination of the source of said signal voltages with means for regulating the torque of an aircraft engine, motive means controlling said regulating means, a balanced circuit interconnecting said source and said motive means, and means for impressing on said circuit a voltage proportional to the altitude of the aircraft, said circuit being unbalanced by changes in the signal voltages of said source and by the impression of the altitude voltages to operate said motive means.

7. In an automatic landing system for aircraft in which a radiant energy beam is received aboard the craft and the signal voltages derived therefrom are utilized to control landing of said craft, the combination of the source of said signal voltages with means for regulating the torque of an aircraft engine, motive means controlling said regulating means, a balanced circuit interconnecting said source and said motive means, means for impressing on said circuit a voltage proportional to the altitude of the aircraft, said circuit being unbalanced by changes in the signal voltages of said source and by the impression of the altitude voltages to operate said motive means, and means controlled by said motive means for rebalancing said circuit upon operation of said motive means.

8. In an automatic landing system for aircraft in which a radiant energy beam is received aboard the craft and the signal voltages derived therefrom are utilized to control landing of the craft, the combination of the source of said signal voltages with means for regulating the airspeed of aircraft with motive means for controlling said regulating means, a circuit interconnecting said voltage source and said motive means including a source of potential variable with altitude, and a source of balancing potential to offset the voltages of said first and second sources to balance said circuit, an unbalance of said circuit operating said motive means to regulate the airspeed of the craft.

9. In an automatic landing system for aircraft in which a radiant energy beam is received aboard the craft and the signal voltages derived therefrom are utilized to control landing of the craft, the combination of the source of said signal voltages with means for regulating the airspeed of aircraft and motive means for controlling said regulating means, a circuit interconnecting said voltage source and said motive means including a source of potential variable with altitude, and a source of balancing potential to offset the voltages of said first and second sources, an unbalance of said circuit operating said motive means to regulate the airspeed of the craft, and means controlled by said motive means for varying the balancing potential to rebalance said circuit upon operation thereof when the airspeed of the craft is in agreement with the voltage signals and the altitude potential.

10. In an automatic landing system for aircraft in which a radiant energy beam is received aboard the craft and the signal voltages derived therefrom are utilized to control landing of the craft, the combination of the source of said signal voltages with a throttle control for an aircraft engine, a motor adapted to position said control, a circuit interconnecting said motor and source, an induction device in said circuit adapted to impress a voltage on said circuit in response to the altitude of the aircraft, and a second induction device in said circuit adapted to impress a voltage on said circuit to balance the voltages of said source and said first device, a change in signal voltage or in the altitude voltage unbalancing said circuit to operate said motor.

11. In an automatic landing system for aircraft in which a radiant energy beam is received aboard the craft and the signal voltages derived therefrom are utilized to control landing of the craft, the combination of the source of said signal voltages with a throttle control for an aircraft engine, a motor adapted to position said control upon operation thereof, a circuit interconnecting said motor and source, an induction device in said circuit adapted to impress a voltage on said circuit in response to the altitude of the aircraft, and a second induction device in said circuit to balance the voltages of said source and said first device, a change in signal voltage or in the altitude voltage unbalancing said circuit to operate said motor, the voltage of said second induction device being varied by the operation of said motor to offset the signal and altitude voltages when throttle control position is in agreement with said voltages.

12. In a system for controlling the landing of multi-engined aircraft automatically in which a radiant energy beam is received aboard the craft and the signal voltages derived therefrom are utilized to control landing of the craft, the combination of the source of said signal voltages with a second source of signal voltage variable with the altitude of the aircraft and connected to said first source, a circuit for controlling the engine torque of each engine and connected across said first and second sources, and means responsive to the difference in engine speeds to synchronize the operations of the engines.

JOEL D. PETERSON.

REFERENCES CITED

The following references are of record in the file of this patent:

UNITED STATES PATENTS

| Number | Name | Date |
|---|---|---|
| 1,997,412 | Fischel | Apr. 9, 1935 |
| 2,133,285 | Dunmore | Oct. 18, 1938 |
| 2,143,137 | Basim et al. | Jan. 10, 1939 |
| 2,323,311 | Crane et al. | July 6, 1943 |
| 2,423,336 | Moseley | July 1, 1947 |